(12) United States Patent
Felton

(10) Patent No.: US 10,298,038 B2
(45) Date of Patent: May 21, 2019

(54) POLAR SOLVENT BASED DEVICE FOR STORAGE AND THERMAL CAPTURE OF ELECTRICAL ENERGY

(71) Applicant: Green-on-Green Energy, Inc., Edmonds, WA (US)

(72) Inventor: Samuel P. Felton, Shoreline, WA (US)

(73) Assignee: Green-on-Green Energy, Inc., Edmonds, WA (US)

( * ) Notice: Subject to any disclaimer, the term of this patent is extended or adjusted under 35 U.S.C. 154(b) by 212 days.

(21) Appl. No.: 15/230,052

(22) Filed: Aug. 5, 2016

(65) Prior Publication Data

US 2016/0344183 A1 Nov. 24, 2016

Related U.S. Application Data

(63) Continuation-in-part of application No. 13/771,970, filed on Feb. 20, 2013, now Pat. No. 9,437,897.
(Continued)

(51) Int. Cl.
*H02J 7/35* (2006.01)
*H02J 7/00* (2006.01)
(Continued)

(52) U.S. Cl.
CPC ............ *H02J 7/0052* (2013.01); *H01G 11/04* (2013.01); *H01M 14/00* (2013.01); *H02J 7/35* (2013.01);
(Continued)

(58) Field of Classification Search
CPC ............. H02J 7/0052; H02J 2007/0059; H02J 7/0059; H02J 7/35; H01G 11/04; H01M 14/00; H02M 3/04
See application file for complete search history.

(56) References Cited

U.S. PATENT DOCUMENTS 5,838,015 A 11/1998 Burdick et al.
6,024,848 A 2/2000 Dufner et al.
(Continued)

OTHER PUBLICATIONS

LTC3109 (Auto-Polarity, Ultralow Voltage Step-Up Converter and Power Manager, Datasheet, Linear Technology, 2010).*
Chen, C. et al., "Annealing a graphene oxide film to produce a free standing high conductive graphene film," Carbon 2012, 50(2012): 659-667.
(Continued)

*Primary Examiner* — Adolf D Berhane
*Assistant Examiner* — Jye-June Lee
(74) *Attorney, Agent, or Firm* — Davis Wright Tremaine LLP; Heather M. Colburn

(57) ABSTRACT

A circuit for use with an external power source and at least one load. The circuit includes a Hydro-Pyroelectrodynamic ("H-PED") storage/capture device ("SCD"), a plurality of contacts, and a recharging device. The H-PED SCD stores electrical energy and is configured to discharge power to at least one output contact of the plurality of contacts. The plurality of contacts also include an input contact configured to be connected to the external power source. The recharging device is configured to be powered by the external power source when the external power source is connected to the input contact and supplies power thereto. The recharging device is operable to charge the H-PED SCD when powered by the external power source. The recharging device may be an infrared light emitting diode configured to generate incident infrared radiation operable to charge the H-PED SCD.

18 Claims, 6 Drawing Sheets

Related U.S. Application Data

(60) Provisional application No. 61/765,207, filed on Feb. 15, 2013.

(51) Int. Cl.
  *H02M 3/04* (2006.01)
  *H01M 14/00* (2006.01)
  *H01G 11/04* (2013.01)

(52) U.S. Cl.
  CPC ........ *H02J 2007/0059* (2013.01); *H02M 3/04* (2013.01)

(56) References Cited

U.S. PATENT DOCUMENTS

| | | | |
|---|---|---|---|
| 7,736,802 B1 | 6/2010 | Smyth | |
| 8,278,876 B2 | 10/2012 | Bucur et al. | |
| 8,883,351 B2 | 11/2014 | Todoriki et al. | |
| 9,768,481 B2* | 9/2017 | Pollack | H01M 14/00 |
| 2002/0154469 A1 | 10/2002 | Shiue et al. | |
| 2005/0255339 A1 | 11/2005 | Tsai et al. | |
| 2006/0132102 A1* | 6/2006 | Harvey | G05F 1/67 320/166 |
| 2007/0096564 A1* | 5/2007 | Maeda | H02J 7/34 307/87 |
| 2008/0050632 A1 | 2/2008 | Salter et al. | |
| 2009/0226798 A1* | 9/2009 | Pollack | H01M 14/00 429/50 |
| 2011/0203631 A1* | 8/2011 | Rasco | H02S 10/30 136/244 |
| 2012/0067390 A1 | 3/2012 | Pollack | |
| 2012/0070734 A1 | 3/2012 | Uetani et al. | |
| 2012/0282530 A1 | 11/2012 | Chiang et al. | |
| 2012/0293110 A1 | 11/2012 | Frederick | |
| 2014/0295265 A1 | 10/2014 | You et al. | |
| 2015/0380203 A1 | 12/2015 | Wang et al. | |
| 2017/0294653 A1 | 10/2017 | Felton et al. | |
| 2018/0175379 A1 | 6/2018 | Tour et al. | |
| 2018/0205113 A1 | 7/2018 | Golodnitsky et al. | |

OTHER PUBLICATIONS

Del, S.K. et al., "Optimizing the optical and electrical properties of graphene ink thin films by laser-annealing," 2D Mater. 2(2015) 011003 (6pp).

Ermakov, V.A. et al., "Nonlocal laser annealing to improve thermal contacts between multi-layer graphene and metals," Nanotechnology 24(2013): 155301 (10pp).

Peleg, Roni, "Laser Annealing May Improve Graphene Inks," graphene-info 2015 [retrieved on Mar. 14, 2017] Retrieved from the internet: http://www.graphene-info.com/laser-annealing-may-improve-graphene-inks.

Non-Final Office Action, dated Jan. 14, 2019, received in U.S. Appl. No. 15/460,011.

Information Disclosure Statement Transmittal submitted herewith.

Chai, et al., "Effect of Radiant Energy on Near-Surface Water," J. Phys Chem B 113(42); Oct. 22, 2009; pp. 13953-13958; copy obtained from http://www.nci.nlm.nih.gov/pmc/articles/PMC2843558/, 9 pages.

Chai, et al., "Solute-Free Interfacial Zones in Polar Liquids," J Phys Chem B 114(16); Apr. 29, 2010, pp. 5371-5375; obtained from http://www.ncbi.nlm.nih.gov/pmc/articles/PMC2865192/ , 8 pages.

Chen, et al., "Force field measurements within the exclusion zone of water," J Biol Phys 38(1); Jan. 2012; pp. 113-120; obtained at http://link.springer.com/article/10.1007%2Fs10864-011-9237-5?LI=true , 4 pages.

Ovchinnikova, et al., "Can Water Store Charge?" Langmuir, 25(1); 2009; published online on Nov. 24, 2008; pp. 542-547.

Zheng, et al., "Long-range forces extending from polymer-gel surfaces," white paper published by University of Washington Department of Bioengineering and in Phys Rev E 68; 2003; pp. 1-14.

Zheng, et al., "Surfaces and interfacial water: Evidence that hydrophilic surfaces have long-range impact," Advances in Colloid and Interface Science 127, Sep. 6, 2006, pp. 19-27.

International Search Report and Written Opinion of the International Search Authority for International Application No. PCT/US14/16553, dated May 19, 2014.

Final Office Action, dated Feb. 26, 2019, received in U.S. Appl. No. 15/460,011.

* cited by examiner

POLAR SOLVENT BASED DEVICE FOR STORAGE AND THERMAL CAPTURE OF ELECTRICAL ENERGY

CROSS REFERENCE TO RELATED APPLICATION(S)

This application is continuation-in-part of U.S. patent application Ser. No. 13/771,970, filed Feb. 20, 2013, which claims the benefit of U.S. Provisional Application No. 61/765,207, filed on Feb. 15, 2013, both of which are incorporated herein by reference in their entireties.

BACKGROUND OF THE INVENTION

Field of the Invention

The present invention is in the field of electrical and electronic devices; more particularly, the technical field of electrical energy storage and capture devices.

Description of the Related Art

Reliable, long-lasting, quick-cycle electricity storage is a missing piece of modern smart-grid infrastructure puzzle. Lack of such storage capability is the reason that electrical energy's utilization pattern has largely been a contemporaneous generator-to-load, closed loop since its characterization in the 17$^{th}$ century. Efficient storage of electrical potential has remained an elusive, yet desirable, goal.

Early discoveries in chemistry and physics led to the development of devices such as the Leyden jar (essentially an air-gap capacitor), and electrolytic batteries, which utilize ionic-exchange chemical reactions to induce electro-motive force ("EMF") in submerged metallic electrodes.

These solutions, while not perfect, have yet allowed the use of electrical energy at times and in locations where immediate generation was not possible. However, for large-scale (especially grid-scale) storage and use, both batteries and capacitors have some serious drawbacks. Batteries have a very short lifespan in terms of charge-discharge cycles (currently, less than 10,000), some have charge-memory, some are very heavy, and nearly all are made with toxic and/or environmentally harmful chemistries. Capacitors have a long lifespan but suffer charge leakage and have a very low capacity compared to batteries.

The hunt for a clean and long-lived solution to these issues is the subject of research and development on a global scale. Unfortunately, some of the best solutions discovered so far use some very toxic chemistries, have high operating temperature ranges (over 100° C.), or are very expensive and difficult to maintain. Some (like Li-Ion) even have fire-safety risks.

Therefore, the need exists for electrical energy storage which is long-lived, inexpensive to maintain, safe and environmentally sound (not to mention, rapid to charge and discharge). The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

All publications cited herein are incorporated by reference to the same extent as if each individual publication was specifically and individually indicated to be incorporated by reference.

A recently-characterized, but previously-observed physical phenomenon known informally as "hydrophilic exclusion zone," "HEZ," or "EZ" naturally forms in aqueous solutions, under certain conditions. See Zheng, J M and Pollack, G H: Long-range forces extending from polymer-gel surfaces, *Phys. Rev. E* 68, 031408 (2003); and Zheng J M, Chin W C, Khijniak E, Khijniak E Jr, Pollack G H: Surfaces and interfacial water: evidence that hydrophilic surfaces have long-range impact, *Adv Colloid Interface Sci.* 2006 Nov. 23;127(1):19-27. This region, in which water in contact with a certain hydrophilic surfaces, will self-organize into a crystal-like structure. Nagornyak, E, Yoo, H and Pollack, G H: Mechanism of attraction between like-charged particles in aqueous solution, *Soft Matter,* 5, 3850-3857, 2009. The water molecules in this structure are densely-packed, extending many thousands of molecule-lengths away from the material. Resulting physical effects of this formation include exclusion of solutes, particulates, and even $H^+$ charges away from the organized (EZ) zone. An influx of electrical or narrowband infrared energy into this system increases the size of the HEZ and the concomitant charge-density of $H^+$-induced the outside of the zone. See Ovchinnikova, K and Pollack, G H: Can water store charge?, *Langmuir,* 25: 542-547, 2009; and Chai, B, Yoo, H. and Pollack, GH: Effect of Radiant Energy on Near-Surface Water, *J. Phys. Chem.* B 113: 13953-13958, 2009.

When current is drained from the device, the HEZ shrinks, but never completely dissipates, holding a residual charge as well.

Figure 1:
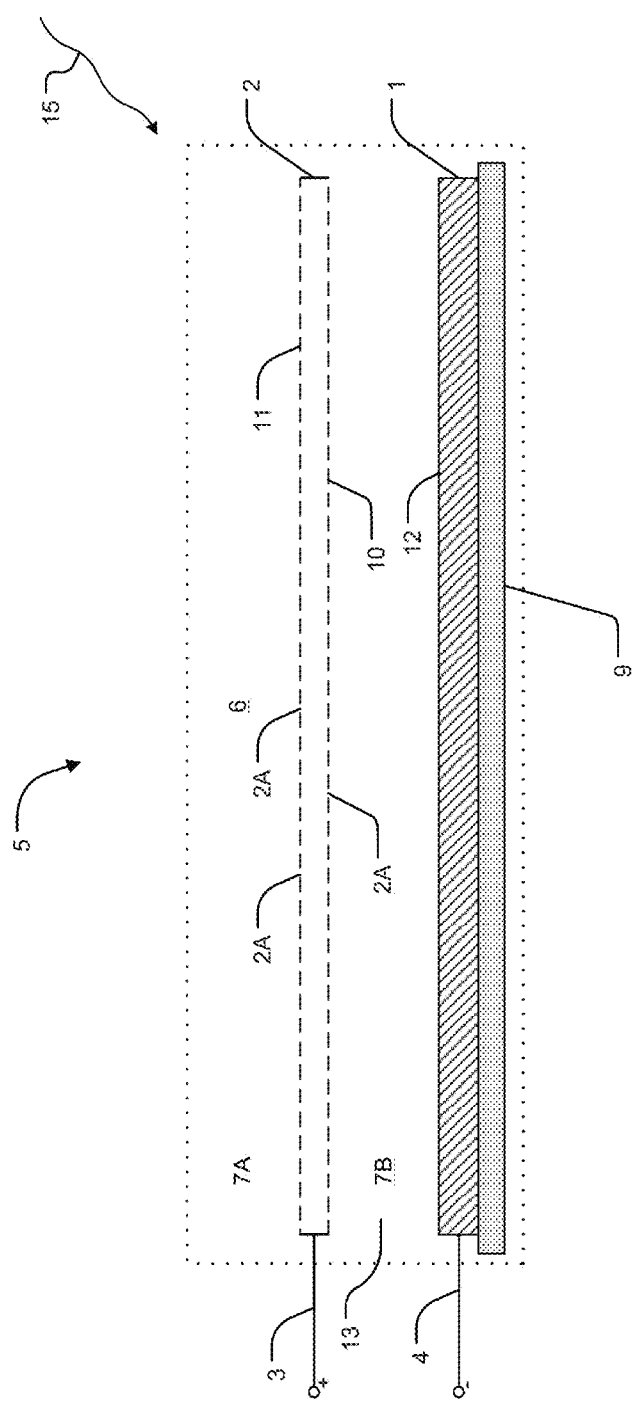
FIG. 1 is a lateral cross-sectional view of a single cell, showing active and passive elements of the cell.
Figure 2:
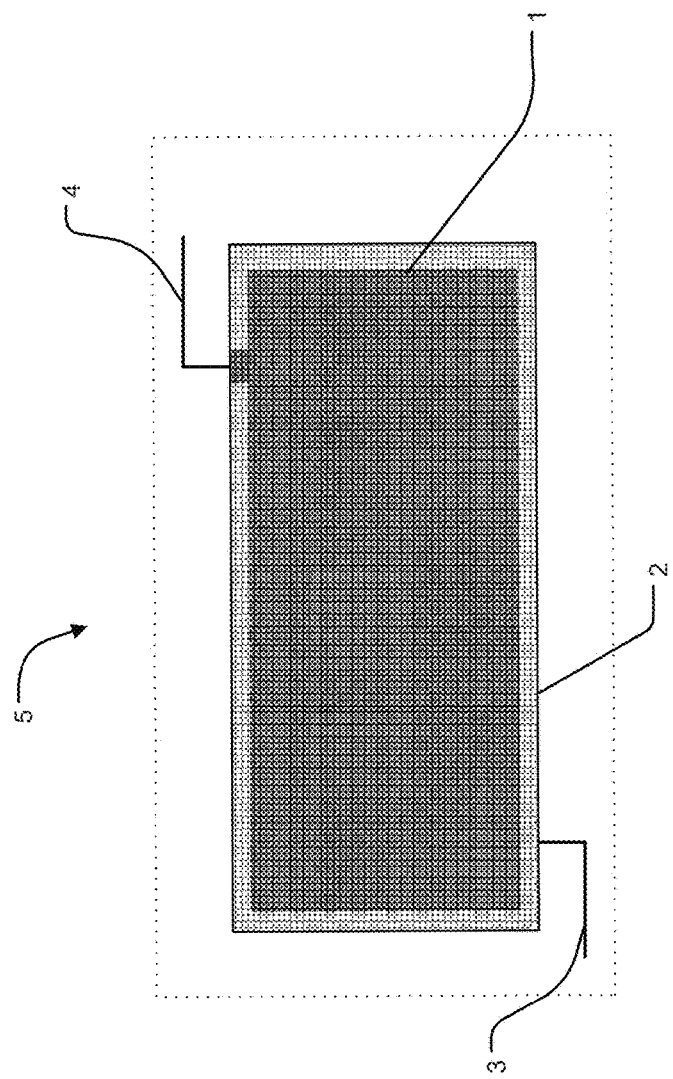
FIG. 2 is a front view of the cell of FIG. 1.
Figure 3:
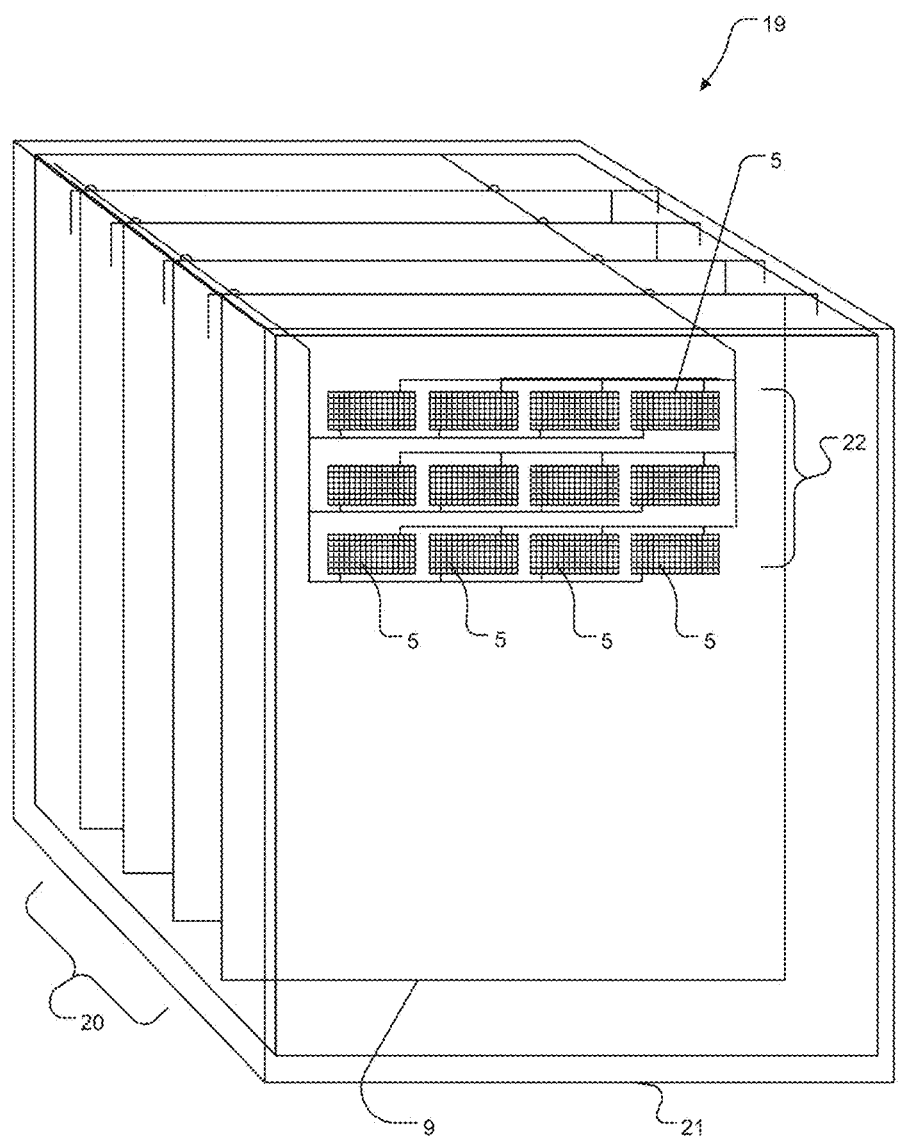
FIG. 3 is a perspective view of a container holding sheets of cells each like the cell shown in FIG. 2.

FIG. 1 is a lateral cross-section of an electrical energy storage cell 5, which may be incorporated in a battery 19 (see FIG. 3). As will be described in greater detail below, the battery 19 may include one or more cells like the cell 5. The cell 5 utilizes the electrical polarization of either side of the HEZ, and its concomitant EMF, to extract charge from the system and thus power electrical devices and circuitry.

The cell 5 includes a cathode electrode 1, an anode electrode 2, and a polar solution 6.

The cathode electrode 1 has an upper hydrophilic surface 12. The cathode electrode 1 may be constructed from any hydrophilic and highly-electrically-conductive material. For example, the cathode electrode 1 may be constructed from a hydrophilic polymer in which carbon nanotubes, bucky-paper, graphene sheets, other planar or matrix, metallic or non-metallic, conductive nanostructures have been imbedded. By way of a non-limiting example, suitable polymers from which the cathode electrode 1 may be constructed include nafion, polyvinyl alcohol, a combination thereof, and the like. Thus, the upper hydrophilic surface 12 may, in this example, be characterized as being both hydrophilic and semi-porous.

Optionally, the cathode electrode 1 is positioned on and supported by a substrate 9. However, this is not a requirement. The substrate 9 may be non-conductive and rigid. By way of a non-limiting example, the substrate 9 may be constructed from a semi-rigid, non-hydrophilic plastic material.

The anode electrode 2 has a first surface 10 opposite a second surface 11. By way of non-limiting example, the anode electrode 2 may include a plurality of pores 2A through which the solution 6 may flow freely. However, in alternate embodiments, the pores 2A may be omitted. For example, if the anode electrode 2 is constructed of a material that is thin and lightweight (e.g., having a density equal to or less than about 4.5 mg/cm$^2$ as a non-limiting example), it will not necessarily require porosity as long as the solution 6 is free to flow around the anode electrode 2. By way of another non-limiting example, the anode electrode 2 may include through-holes, through-slots, and/or other types of pathways that extend between the first and second surfaces 10 and 11 and are configured to allow a portion of the solution 6 to flow through the anode electrode 2.

The anode electrode 2 is configured to maintain structural integrity while in contact with the solution 6. The anode electrode 2 is electrically isolated from the cathode 1. In the embodiment illustrated, the anode electrode 2 floats above and is neither attached to the cathode electrode 1 nor to any of the structures in direct contact with the cathode electrode 1. In alternate embodiments, the anode electrode 2 may be attached along at least a portion of its periphery to the substrate 9 supporting the cathode 1, while yet maintaining electrical isolation from the cathode 1. In some embodiments, the anode electrode 2 is flexible. The anode electrode 2 may be constructed from a highly-conductive, light, yet rigid aerogel material. As with the conductive parts of the cathode electrode 1, the anode electrode 2 may optionally be constructed from carbon nanotubes, buckypaper, graphene sheets, other planar or matrix, metallic or non-metallic, conductive nanostructures. Such conductive materials may be embedded in the aerogel material, a polymer, and the like.

The cathode electrode 1 and the anode electrode 2 are submerged in the solution 6. The solution 6 may be characterized as having a first portion 7A and a second portion 7B. The first portion 7A is adjacent the second surface 11 of the anode electrode 2. A gap 13 is defined between the upper hydrophilic surface 12 of the cathode electrode 1 and the first surface 10 of the anode electrode 2. The gap 13 forms when the cell 5 is filled with the solution 6. The second portion 7B resides in the gap 13 and is therefore adjacent the first surface 10 of the anode electrode 2 and the upper hydrophilic surface 12 of the cathode electrode 1.

The anode electrode 2 is configured to move and/or flex in at least one dimension. This moving and/or flexing allows a distance between the first surface 10 of the anode electrode 2 and the upper hydrophilic surface 12 of the cathode electrode 1 to change to thereby change the size of the gap 13. When the size of the gap 13 changes, the volume of the second portion 7B of the solution 6 residing in the gap 13 also changes. For example, when the gap 13 contracts, at least a portion of the second portion 7B of the solution 6 may be forced from inside the gap 13 (e.g., through the pores 2A) into the first portion 7A. Similarly, when the gap 13 expands, at least a portion of the first portion 7A of the solution 6 may flow into the gap 13 (e.g., via the pores 2A).

Contact with the upper hydrophilic surface 12 of the cathode electrode 1 causes the second portion 7B in the gap 13 to change state and self-order, forming an exclusion-zone ("EZ"). On the other hand, the first portion 7A of the solution 6 is generally unordered and in a higher entropic state than that of the ordered second portion 7B. As the structure forming the EZ self-assembles in the gap 13, the molecules in the second portion 7B of the solution 6 form a tightly-packed crystalline lattice. Solutes, precipitates, and other suspended solids are forcibly excluded from the second portion 7B of the solution 6, including the material composing the anode electrode 2 structure. This exclusion of the anode electrode 2 causes the anode electrode 2 to be forced out of the gap 13, placing the anode electrode 2 within but at the immediate near-edge of the unordered first portion 7A of higher H$^+$ potential, thus providing a positive charge relative to the exclusion-zone itself.

The solution 6 may be implemented using either protic or aprotic polar liquids, such as water, alcohol, formic acid, dimethylsulfoxide ("DMSO"), ethanol, methanol, propylene carbonate, a combination thereof, and the like. It may be desirable to use liquids having high dielectric constants, such as de-ionized water. In order to prevent freezing, an admixture of polar reagents may be used, such as, but not limited to, ethanol and water.

Optionally, the electrically conductive leads 3 and 4, which by non-limiting example may be constructed from copper metallic, or other conductive material, are connected to the cathode electrode 1 and the anode electrode 2, respectively. The conductive leads 3 and 4 may be plated, soldered or otherwise electrically bonded to the cathode electrode 1 and the anode electrode 2, respectively.

When first introduced, the solution 6 flows into porous areas (e.g., the pores 2A of the anode electrode 2) and vacant areas (e.g., the gap 13) in the cell 5. Upon contact with the upper hydrophilic surface 12 of the cathode electrode 1, the second portion 7B of the solution 6 in contact with the upper hydrophilic surface 12 of the cathode electrode 1 will self-order as previously described. This activity forces solutes, precipitates, and suspended solids (such as the anode electrode 2) out of the gap 13 of the ordered second portion 7B of the solution 6. In conjunction with the formation of the ordered second portion 7B in the gap 13 and as is common in polar crystalline structures, the ordered second portion 7B of the solution 6 becomes polarized.

Either of the following two conditions may cause the ordered second portion 7B in the gap 13 to expand in a converse linear fashion to the unordered first portion 7A of the solution 6:

1. the application of polarity-correct direct current across the positive lead 3 attached to the anode electrode 2 and the negative lead 4 attached to the cathode electrode 1; or
2. incident, infra-red ("IR") radiation 15 in the wavelength band as described in Chai, B, Yoo, H. and Pollack, G H: Effect of Radiant Energy on Near-Surface Water, *J. Phys. Chem.* B 113: 13953-13958, 2009.

When the volume of the ordered second portion 7B expands with respect to the volume of the unordered first portion 7A, the charge differential formed in proximity of ordered second portion 7B and unordered first portion 7A of the solution 6 creates an electrical potential between the positive lead 3 and the negative lead 4

Incoming, polarity-correct direct current of a higher potential than that of the anode and cathode electrodes 2 and 1 may be applied across the leads 3 and 4.

Alternatively, when connected to any external load (not shown), the potential across the leads 3 and 4 will discharge through the load.

Figure 4:
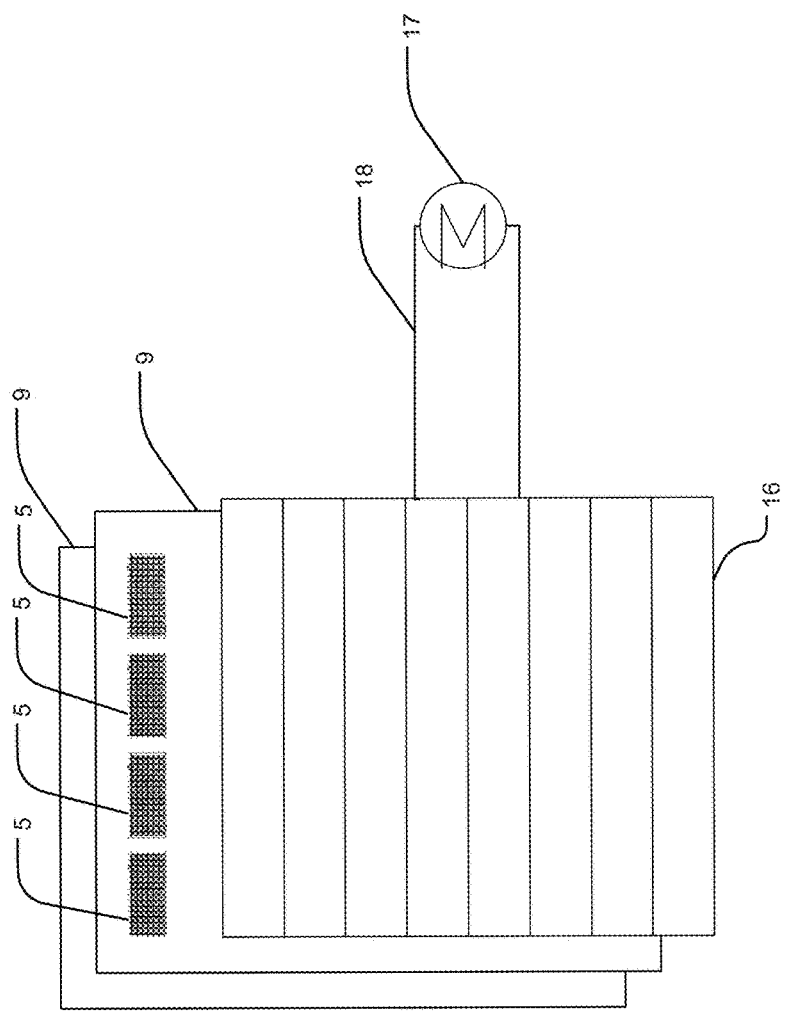
FIG. 4 is a front view of sheets of cells each like the cell shown in FIG. 2 with additional infrared heat exchanger assemblies.

Turning to FIG. 4, optionally, heat exchanger plates 16 may be interleaved between assemblies of multiple cells 5 arranged on adjacent substrates 9. The heat exchanger plates 16 may optionally be connected to any of a number of external heat exchanger devices 17 via incoming and outgoing heat-conduction elements 18, including but not in any way limited to heat pipe, infrared-conductive optical tubing, etc.

FIG. 3 is a perspective view of the composite battery 19 that includes an array 20 of substrates 9 arranged in a container 21. An array 22 of the cells 5 is mounted on each of the substrates 9. In this embodiment, each of the substrates 9 may be configured as a sheet.

The cells 5 in each of the arrays 22 are, purely by example, combined in a series-parallel electrical arrangement, so as to create the necessary voltage and amperage for a given application. Each of the substrates 9 of the array 20 may be subsequently connected together in a parallel, to increase amperage for a given application. However, as is apparent to those of ordinary skill in the art, the substrates 9 of the array 20 may alternatively be connected in series. Further, selected ones of the substrates 9 may be connected in series while others are connected in parallel.

The container 21 is filled with the solution 6 prior to use.

The substrates 9 shown in FIG. 3 may be constructed from any sufficiently hydrophobic material, that is both high strength and electrically non-conductive.

The container 21 may be constructed from any hydrophobic material, having sufficient strength to hold the solution 6 in the quantity desired without leakage or deformation. The container 21 is either electrically non-conductive or coated with a hydrophobic, non-electrically-conductive material and electrically isolated from the active electronic components of the battery 19.

Depending on the implementation details, the battery 19 may be simple to construct and easy to transport when empty. When placed in use, the battery 19 may be filled with clean, deionized or filtered water and sealed. The battery 19 may be drained and refilled in situ to ensure cleanliness of the solution 6.

The battery 19 may be configured to withstand many hundreds of thousands of charge-discharge cycles without significant mechanical or electrical deterioration.

An electrical energy storage device has been described above. The device may include a containment vessel, a porous, hydrophilic cathode electrode, a lightweight, porous anode electrode, a protic or aprotic polar liquid, a first conductor, and a second conductor. Optionally, the anode electrode may be free to move in at least one dimension. The liquid may include a first portion positioned between the cathode electrode and the anode electrode, in direct contact with both. The liquid may also include a second portion in contact with and covering a distance between the anode electrode and the edge of the containment vessel. The first conductor is electrically connected to the cathode electrode, and configured to allow electrical current to move into and out of the device. The second conductor is electrically connected to the anode electrode, and configured to allow electrical current to move into and out of the device. Optionally, the device may include an optional attached electrical switch device that allows one way current flow in either direction through the attached anode electrode. Multiple devices may be arranged in such a way as to allow them to be electrically connected in either series or parallel or some combination thereof, to achieve a desired voltage and amperage. When multiple devices have been arranged to achieve a desired voltage and amperage, infrared-capable waveguides, into which infrared energy may be introduced, may be used to capture charge.

A framework containing individual cells for the storage and retrieval of electrical energy has been described above. Each cell may include a thin layer of a hydrophilic compound, within which is embedded or otherwise suspended a very thin, highly electrically-conductive material. The porous, electrically-conductive material forms a cathode. Each cell may also include a second, suspended, thin, and highly electrically conductive porous surface for use as an anode. Electrically conductive lead material drains and replenishes direct-current electrical energy to and from the aforementioned cells. Any polar liquid, such as water, formic acid, dimethylsulfoxide, ethanol, or propylene carbonate may be used. Optionally, a heat-exchange apparatus may be used to conduct infrared energy to and from the outside of the device's container and the interior. The transfer material should be non-electrically-conductive if possible. However, if this is not possible, the exchanger may be produced from metallic or conductive materials that should be electrically isolated from all other electrically conductive componentry (floating). As described above, the external container may hold multiple frameworks and switch devices. The container may be either composed of or lined with a non-conducting, non-hydrophilic, watertight material, with drain and filling tubing.

Figure 5:
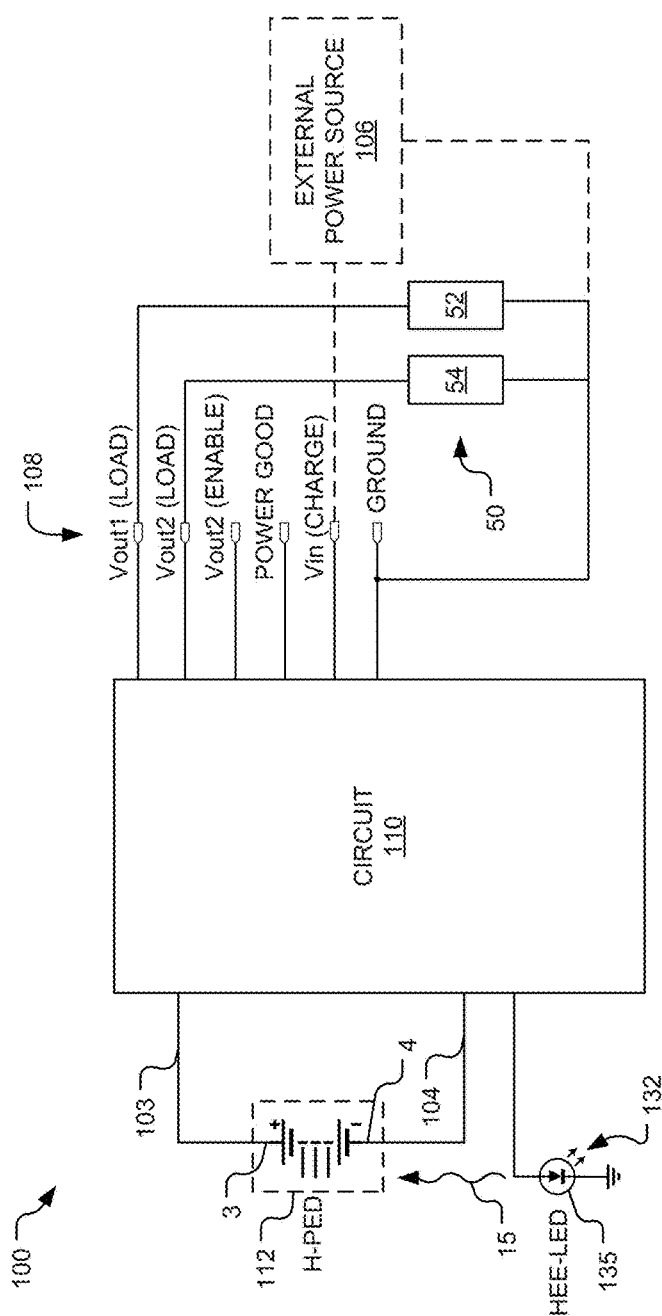
FIG. 5 is a schematic diagram of a Hydro-Pyroelectro-dynamic ("H-PED") storage/capture device ("SCD") connected to a pair of loads by an exemplary cell load circuit.

Referring to FIG. 1, the cell 5 and/or the battery 19 (see FIG. 3) may each be characterized as being a Hydro-Pyroelectrodynamic ("H-PED") storage/capture device ("SCD"). As explained above, when connected to any external load, the potential across the leads 3 and 4 (of a H-PED SCD) will discharge through the load. FIG. 5 depicts a system 100 in which a circuit 110 connects the leads 3 and 4 of one or more H-PED SCD 112 (e.g., the cell 5, the battery 19, and the like) to one or more loads 50. In FIG. 5, the circuit 110 is illustrated connected to two loads 52 and 54. However, the circuit 110 may be connected to any number of loads. By way of non-limiting examples, the loads 50 may be resistive, inductive, capacitive, or any combination thereof. In FIG. 5, the loads 52 and 54 are connected to the circuit 110 in parallel. However, the loads 50 (e.g., multiple devices) may be to be connected to the circuit 110 in series or parallel, as previously described.

The circuit 110 includes a plurality of contacts 108. In the embodiment illustrated, the contacts 108 include contacts "Vout1 (load)" and "Vout2 (load)" that are connected to the loads 52 and 54, respectively. The contacts 108 include a contact "GROUND," which is connect to ground and each of the loads 50. The contacts 108 include a contact "Vin (charge)," which may be connected to an optional external power source 106.

The contacts 108 include a contact "Vout2 (enable)," which may be tied to the contact "Vout1 (load)" and enables the "Vout2 (load)." In other words, when connected to the contact "Vout1 (load)," the contact "Vout2 (enable)" allows (or enables) the contact "Vout2 (load)" to supply power to the load 54. On the other hand, the contact "Vout2 (enable)" may be connected to the contact "GROUND." When connected to the contact "GROUND," the contact "Vout2 (enable)" disables the contact "Vout2 (load)" preventing it from supplying power to the load 54.

The contacts 108 include a contact "POWER GOOD" that indicates when the H-PED SCD 112 has a sufficient charge to run (or power) the loads 50. The contact "POWER GOOD" may have a low or a high voltage output. When the contact "POWER GOOD" has a high voltage output, the H-PED SCD 112 has sufficient charge. On the other hand, when the contact "POWER GOOD" has a low voltage output, the H-PED SCD 112 has insufficient charge and may accept charging (from the optional external power source 106) through a charging circuit portion 140 (described below) and through a recharging device 132 (described below). The contact "POWER GOOD" indicates (by the high voltage output) to off board circuitry (such as the loads 50) when power may be drawn from the H-PED SCD 112, because the H-PED SCD 112 has sufficient charge. The contact "POWER GOOD" also indicates (by the low voltage output) to an off board power source (such as the optional external power source 106) that the H-PED SCD 112 can accept charge (or power to the charging circuit portion 140 and to the recharging device 132).

The circuit 110 includes conductors 103 and 104 (e.g., leads, wires, and the like) configured to be connected to the leads 3 and 4, respectively. Thus, the circuit 110 may receive power from the H-PED SCD 112 via the leads 3 and 4. Alternatively, the circuit 110 may deliver power to the H-PED SCD 112 via the leads 3 and 4. For example, the H-PED SCD 112 may receive power from the optional external power source 106 connected to the contacts "Vin (charge)" and "GROUND."

The circuit 110 may be connected to the recharging device 132 configured to receive power from the external power source 106 via the contact "Vin (charge)" and recharge the H-PED SCD 112. Referring to FIG. 1, as mentioned above, the incident IR radiation 15 may cause the ordered second portion 7B in the gap 13 to expand in a converse linear fashion to the unordered first portion 7A of the solution 6. In the embodiment illustrated in FIG. 5, the recharging device 132 may be implemented as a HEE-LED 135. The HEE-LED 135 is an infrared LED that provides the incident IR radiation 15 (see FIG. 1) as previously described. Referring to FIG. 5, when the charge of the H-PED SCD 112 drops below a threshold amount (e.g., about 0.06 VDC), an external current is applied to the contact "Vin (charge)" by the external power source 106 and the HEE-LED 135 is illuminated, which add energy to the system 100. Alternatively, referring to FIG. 4, the recharging device 132 may be implemented as the external heat exchanger devices 17, and/or the incoming and outgoing heat-conduction elements 18. However, the HEE-LED 135 (see FIGS. 5 and 6) may be used instead and in place of the heat exchanger plates 16, the external heat exchanger devices 17, and/or the incoming and outgoing heat-conduction elements 18.

Figure 6:
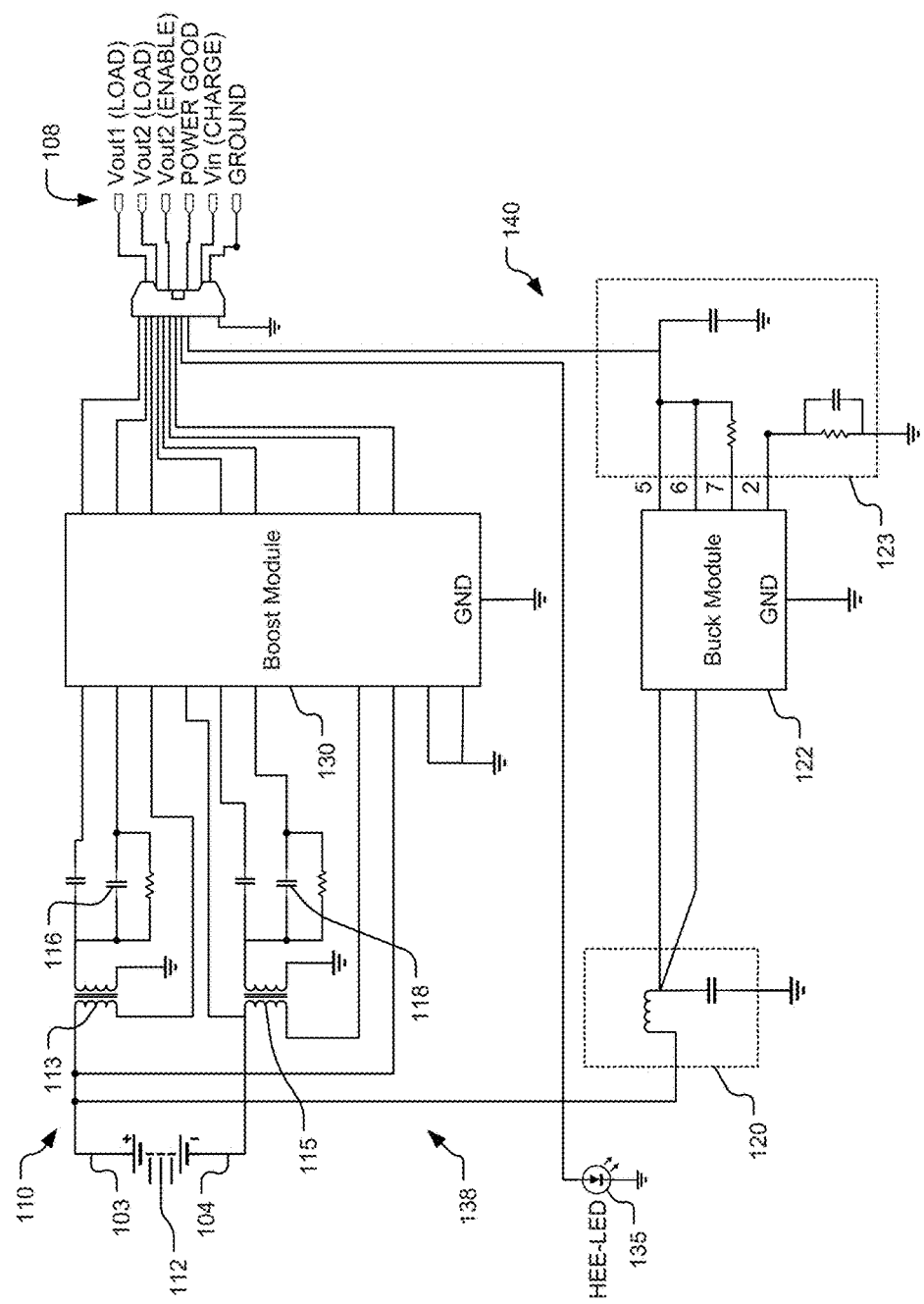
FIG. 6 is a schematic diagram of the exemplary cell load circuit of FIG. 5, which includes an electrically-switched output circuit portionand a charging circuit portion.

FIG. 6 is a schematic diagram of the circuit 110, which may be characterized as being a switching and regulation network. Referring to FIG. 6, the circuit 110 has an output circuit portion 138 and the charging circuit portion 140. The output circuit portion 138 is configured to control (or regulate) power delivered to each of the loads 50. For example, the output circuit portion 138 may be configured to apply an independently variable voltage and current to the loads 50. Referring to FIG. 5, the charging circuit portion 140 (see FIG. 6) is configured to accept charging current (from the external power source 106 via the contact "Vin (charge)") and transfer the charging current into the H-PED SCD 112.

Referring to FIG. 6, the output circuit portion 138 includes two inductors 113 and 115, resistor-capacitor ("RC") networks 116 and 118, and an output boost circuit (implemented as a boost module 130). The inductors 113 and 115 may each be implemented as a ferrite-core coupled inductor.

The boost module 130 may be a configured as a dual, phase-coupled-inductor Ćuk converter. By way of a non-limiting example, the boost module 130 may be implemented as a model LTC3109, Auto-Polarity, Ultralow Voltage Step-Up Converter and Power Manager, manufactured by Linear Technology Incorporated of Milpitas, Calif. Upon connection to the loads 50, the boost module 130 acts as a "proxy" for each of the loads 50. In the embodiment illustrated, the boost module 130 accepts current from the H-PED SCD 112, boosts the voltage of the current (received from the H-PED SCD 112) to an adjustable level (e.g., between about 4.5 VDC and about 5 VDC), and delivers the current to the loads 52 and 54 illustrated in FIG. 5 via the contacts "Vout1 (load)" and "Vout2 (load)". Thus, referring to FIG. 6, the output circuit portion 138 provides independently variable voltage and current to each of the loads 52 and 54 (see FIG. 5). The inductors 113 and 115 act as a combination step-up transformer and as an EMF flyback portion of the Ćuk circuit.

The H-PED SCD 112 may be configured for high amperage, low voltage storage. By way of non-limiting examples, the H-PED SCD 112 may be configured to store about 0.250 volts to about 0.5 volts, at fast-discharge amperage of about 0.4 amps per cell to about 0.6 amps per cell.

Referring to FIG. 6, the charging circuit portion 140 of the circuit 110 includes an LC tank 120, a buck charging regulator 122, and an RC network 123. As is known to those of ordinary skill in the art (and illustrated in FIG. 6), the LC tank 120 includes an inductor and a capacitor. The LC tank 120 may also function as a filter. The RC networks 116 and 118 act as a capacitor or "C" portion of the LC tank 120, and time a duty-cycle of direct current ("DC") pulses in the LC tank 120.

In the embodiment illustrated, the buck charging regulator 122 is implemented as a single-ended primary-inductor converter ("SEPIC") DC-DC buck module. By way of a non-limiting example, the boost module 130 may be implemented as a model LTC3606B, 800 mA Synchronous Step-Down DC/DC with Average Input Current Limit, manufactured by Linear Technology Incorporated of Milpitas, Calif. The buck charging regulator 122 utilizes the LC tank 120 in a resonant configuration. The buck charging regulator 122 may include ultra-high-speed and low voltage-drop diodes that utilize reverse-EMF energy from the LC tank 120 to buck the current flow to the H-PED SCD 112 and reduce the voltage of the current flow to a level that may increase the density and/or size of the HEZ (e.g., the second portion 7B illustrated in FIG. 1) of the H-PED SCD 112 as previously described. This may effectively increase the voltage of the H-PED SCD 112. In other words, the charging circuit portion 140 may be used to recharge the H-PED SCD 112. At the same time, referring to FIG. 5, the circuit 110 may supply power to the recharging device 132 (described above).

As discussed above, the H-PED SCD 112 is operable to discharge power (via the circuit 110) to the loads 50 (see FIG. 5). When discharging, the H-PED SCD 112 is configured to function as both a current source and a ripple filtering capacitor. As explained above, the H-PED SCD 112 contains the solution 6 and the second portion 7B of the solution 6 may be characterized as being a polar separator. The second portion 7B is non-ionic and, consequently, is non-conductive. Resultantly, the H-PED SCD 112 exhibits capacitive reactance in response to an alternating current ("AC") signal applied across its inputs (e.g., the leads 3 and 4). Thus, the H-PED SCD 112 may be characterized as providing an intrinsic capacitor. Referring to FIG. 1, the intrinsic capacitor, the value of which, in Farads, varies as a function of (1) surface area of the electrodes 1 and 2), (b) distance between the electrodes 1 and 2, and (c) permittivity of the separating medium (e.g., the second portion 7B) multiplied by permittivity of -vacuum. Thus, the value of the intrinsic capacitor (in Farads) increases as surface area of the electrodes 1 and 2 increases, the distance between the electrodes 1 and 2 decreases, and permittivity of the second portion 7B increases. This intrinsic capacitor functions as both an AC snubber and ripple filter (both via capacitive reactance), in parallel termination of both the output circuit portion 138 and the charging circuit portion 140. The H-PED SCD 112, acting as a ripple filter, helps remove residual periodic variation in direct current carried in the charging circuit portion 140 when the power received from the optional external power source 106 is in the form of alternating current. The H-PED SCD 112, acting as an AC snubber, provides a shunt for alternating current produced by the boost module 130 so that the apparent potential at the output of the H-PED SCD 112 is DC as presented to the input of the boost module 130.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A circuit for use with an external power source and at least one load, the circuit comprising:
    a plurality of contacts, the plurality of contacts comprising an input contact configured to be connected to the external power source, and at least one output contact configured to be connected to the at least one load;
    a Hydro-Pyroelectrodynamic ("H-PED") storage/capture device ("SCD") storing electrical energy, the H-PED SCD being connected to the at least one output contact and configured to discharge power to the at least one output contact;
    a recharging device configured to be powered by the external power source when the external power source is connected to the input contact and supplies power to the input contact, the recharging device generating non-electrical energy operable to charge the H-PED SCD when the recharging device is powered by the external power source; and
    a charging circuit portion connected to the input contact and the H-PED SCD, the charging circuit portion comprising a buck charging regulator configured to produce reduced voltage electricity by reducing a voltage of input electricity received from the input contact, the charging circuit portion charging the H-PED SCD by delivering the reduced voltage electricity to the H-PED SCD.

2. The circuit of claim 1, wherein the recharging device is an infrared light emitting diode configured to generate incident infrared radiation, and
    the incident infrared radiation charges the H-PED SCD when the recharging device is powered by the external power source.

3. The circuit of claim 1, wherein the recharging device comprises at least one heat exchange device configured to generate heat energy, and
    the heat energy charges the H-PED SCD when the recharging device is powered by the external power source.

4. The circuit of claim 1 for use with the at least one load being a plurality of loads, wherein the at least one output contact comprises a plurality of output contacts,
    the circuit comprises an output circuit portion that connects the plurality of output contacts to the H-PED SCD,
    the plurality of output contacts connect the plurality of loads to the output circuit portion in parallel, and
    the output circuit portion is configured to apply an independently variable voltage and current to each of the plurality of loads.

5. The circuit of claim 1, wherein the H-PED SCD is configured to function as both a current source and a ripple filtering capacitor when discharging power to the at least one load.

6. The circuit of claim 5, wherein
the H-PED SCD provides an intrinsic capacitor that functions as at least one of an alternating current snubber and a ripple filter on the charging circuit portion.

7. The circuit of claim 1, wherein the plurality of contacts comprise a power indicating contact configured to indicate to the external power source when the H-PED SCD lacks sufficient charge, and
the external power source is configured to supply the input electricity to the input contact when the power indicating contact indicates to the external power source that the H-PED SCD lacks sufficient charge.

8. The circuit of claim 7, wherein the power indicating contact is configured to indicate to the at least one load when the H-PED SCD has sufficient charge, and
the at least one load is configured to receive power from the at least one output contact when the power indicating contact indicates to the at least one load that the H-PED SCD has sufficient charge.

9. The circuit of claim 1, wherein the plurality of contacts comprises a power indicating contact configured to indicate to the at least one load when the H-PED SCD has sufficient charge, and
the at least one load is configured to receive power from the at least one output contact when the power indicating contact indicates to the at least one load that the H-PED SCD has sufficient charge.

10. The circuit of claim 1, wherein the plurality of contacts comprise a ground contact configured to be connected to the external power source and the at least one load.

11. The circuit of claim 1, further comprising:
a boost module configured to accept stored electricity from the H-PED SCD, boost a voltage of the stored electricity, and deliver the stored electricity to the at least one output contact.

12. The circuit of claim 11, wherein the boost module is a dual, phase-coupled-inductor Ćuk converter.

13. The circuit of claim 12, further comprising:
a pair of inductors configured to act as a combination step-up transformer and as an EMF flyback portion of a Ćuk circuit including the boost module.

14. The circuit of claim 1, wherein the buck charging regulator is a single-ended primary-inductor converter DC-DC buck module.

15. The circuit of claim 1, wherein the charging circuit portion comprises:
an inductor-capacitor tank operable in a resonant configuration that generates reverse-EMF energy, the buck charging regulator being configured to utilize the reverse-EMF energy to reduce the voltage of the input electricity.

16. The circuit of claim 15, wherein the H-PED SCD has a hydrophilic exclusion zone with a density and a size, and
the reduced voltage electricity increases at least one of the density and the size of the hydrophilic exclusion zone of the H-PED SCD.

17. The circuit of claim 16, wherein the buck charging regulator comprises diodes that reduce the voltage of the input electricity.

18. The circuit of claim 17, wherein the diodes are ultra-high-speed and low voltage-drop diodes.

* * * * *